United States Patent [19]

Friedman

[11] 4,134,655
[45] Jan. 16, 1979

[54] FILM UNIT DEFLECTION SYSTEM FOR SELF DEVELOPING CAMERA

[75] Inventor: Harvey S. Friedman, Natick, Mass.

[73] Assignee: Polaroid Corporation, Cambridge, Mass.

[21] Appl. No.: 721,992

[22] Filed: Sep. 9, 1976

[51] Int. Cl.$^2$ ............................................. G03B 17/52
[52] U.S. Cl. ...................................... 354/86; 354/304
[58] Field of Search ....................... 354/83, 84, 85, 86, 354/301, 304, 277

[56] References Cited

U.S. PATENT DOCUMENTS

| | | | |
|---|---|---|---|
| 3,810,211 | 5/1974 | Wareham et al. | 354/86 |
| 3,940,774 | 2/1976 | Ivester | 354/83 |
| 3,983,570 | 9/1976 | Maltese et al. | 354/304 |
| 3,994,002 | 11/1976 | Invester | 354/86 |
| 3,996,595 | 12/1976 | Invester | 354/83 |
| 4,034,386 | 7/1977 | Gold | 354/86 |

Primary Examiner—John Gonzales
Assistant Examiner—Alan Mathews
Attorney, Agent, or Firm—David R. Thornton

[57] ABSTRACT

A self-developing camera utilizes a fixed cam surface and a resilient deflector strip to introduce a local longitudinal bend in a film unit as it proceeds over a relatively short portion of a film processing path from the nip of a pair of processing rollers to an exit slot. The deflector strip is secured near the end of the cam surface adjacent the exit slot with a free edge positioned to intercept the film unit proceeding from the rollers across the cam surface. The strip itself deflects upon engagement with the film unit to exert a spring force that produces in the film unit the local longitudinal bending which enhances distribution of a fluid photoprocessing composition within the film unit over its entire image-forming photosensitive area and in a layer of generally uniform thickness. The strip, however, is spaced sufficiently from the rollers and is sufficiently resilient so that it does not impede the ejection, through the same processing path, of a relatively stiff dark slide which is packaged with the film units for protection and optical shielding prior to exposure.

7 Claims, 8 Drawing Figures

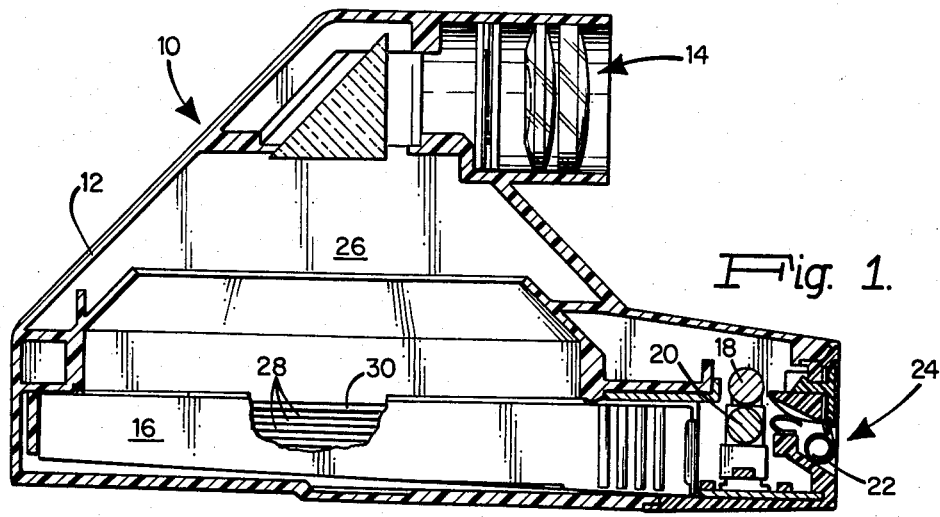
Fig. 1.
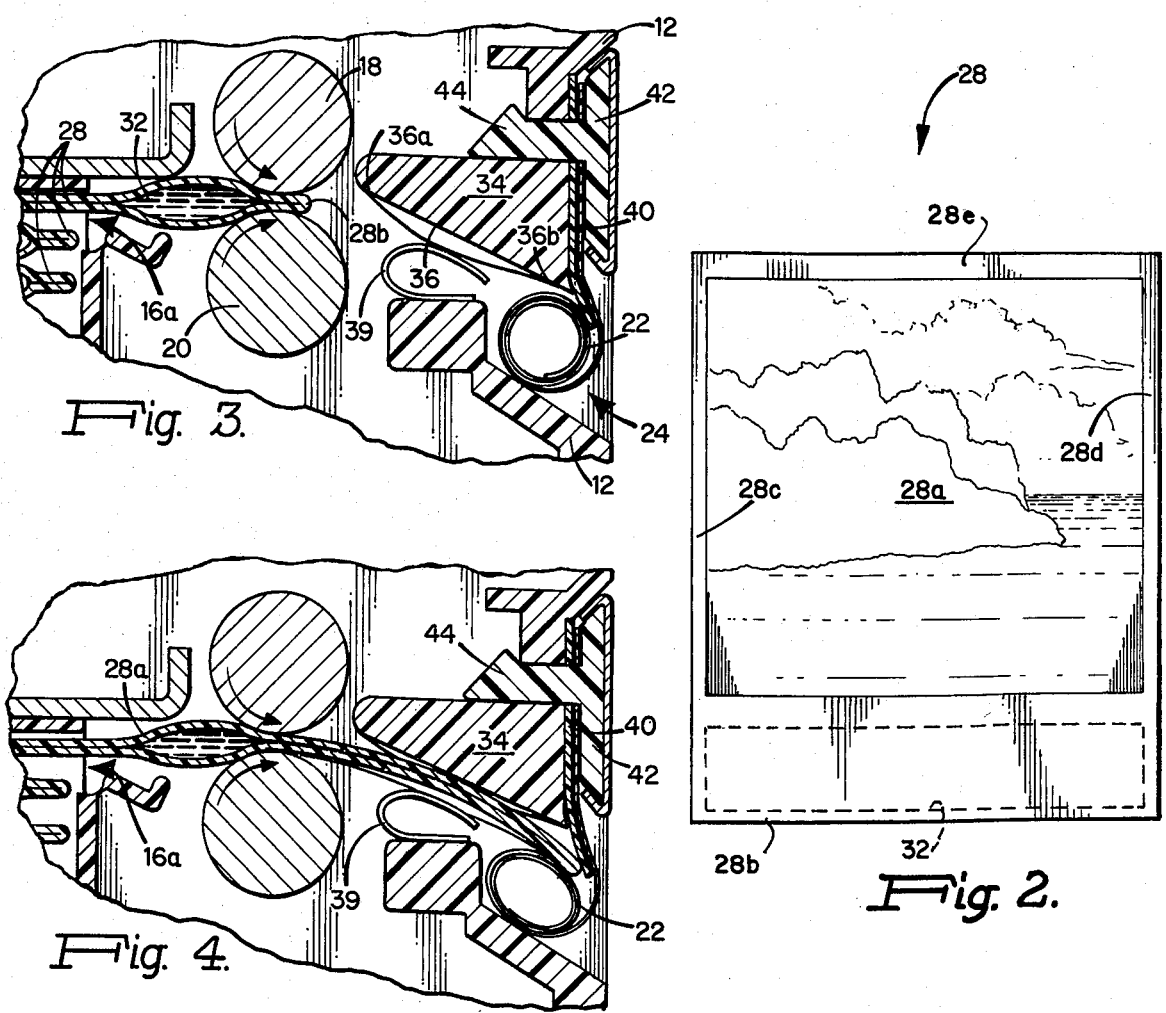
Fig. 3.
Fig. 2.
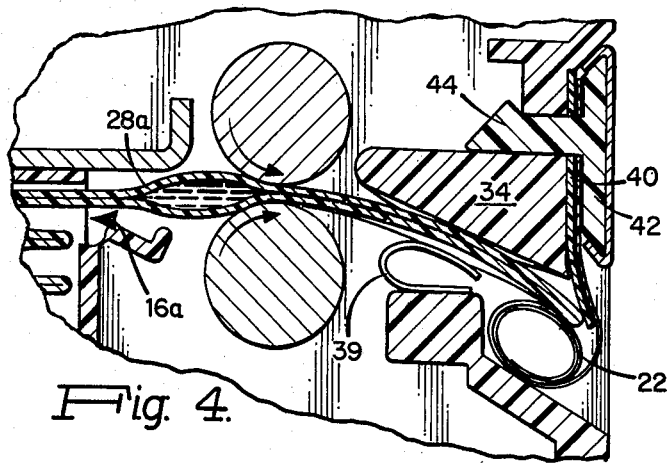
Fig. 4.

FILM UNIT DEFLECTION SYSTEM FOR SELF DEVELOPING CAMERA

BACKGROUND OF THE INVENTION

This invention relates in general to photographic apparatus. More particularly it provides a film unit deflection system for use in self-developing cameras to control the distribution of a fluid photoprocessing composition within a self-processing film unit after a set of pressure-applying rollers initiate development of the film unit.

In self-processing film units of the type described in U.S. Pat. Nos. 3,415,644 and 3,594,165, a layer of a viscous fluid photoprocessing composition is spread over the exposed photosensitive surface to develop the image. The photoprocessing composition is typically held in a container at a forward edge of the film unit. The development process is initiated within the camera by passing the exposed film unit through the nip of a pair of pressure-applying rollers which rupture the container and spread the composition over the exposed photosensitive surface by a squeezing action.

Usually these film units are packaged in stacked relation in a film container or cassette that is conveniently loaded in the camera. To protect the film units from damage and exposure to light, the foremost film unit in the stack is covered by an opaque "dark slide" that is usually in the form of a rectangular piece of cardboard. The dark slide is stiffer than the film units and therefore exhibits a greater resistance to longitudinal bending than the film units. When the cassette is loaded in the camera, the dark slide is removed from the cassette in the same manner as the film units, that is, by advancement along a film processing path defined by the processing rollers, various film guide structures, and a film exit slot.

While the processing rollers are a generally effective arrangement for releasing and spreading the photoprocessing fluid over the photosensitive area of the film unit, the photoprocessing fluid tends to distribute in an uneven manner which detracts from the quality of the fully of the fully developed print. In particular, because the film unit is formed of flexible layers that are bound at their edges, the layer of photoprocessing fluid tends to be thicker at the central portions of the film unit than at its lateral portions and often fails to fill the trailing corners of the photosensitive area. Such voids result in dark, undeveloped corners on the resultant photograph.

On approach to solving these maldistribution problems described in U.S. Pat. Nos. 3,799,770 and 3,820,137, proposes that the film container and the camera, respectively, have structures for applying a secondary pressure to a central portion of the film unit to force the photoprocessing composition toward the edges of the film unit. Another prior solution is to influence the distribution of the composition by bending the film unit after it emerges from the processing rollers. For example, U.S. Pat. No. 3,810,211 describes a camera having a structure for inducing in the film unit a downward bend that places the upper flexible layer of the film under tension and the lower flexible layer under compression, and which thereby results in the desired distribution of the composition. In this camera, the deflecting structure is a plate which also acts as a light-shielding member.

In other self-developing camera, where the distance between the processing rollers and the exit slot is relatively short, (approximately ¾ inch or 19.0 millimeters) an equivalent bending of the film unit is achieved by a smooth cam surface that deflects the film unit downwardly from the processing rollers to an exit slot. A commonly assigned, copending U.S. application Ser. No. 554,780, filed Mar. 3, 1975, now U.S. Pat. No. 3,994,002, by Andrew, S. Ivestor for "Self-Developing Camera with Film Unit Deflecting Structure" describes such a camming surface. It is also known to form a pair of raised areas on this camming surface that are aligned with the longitudinal edges of the film unit as described in the commonly assigned, copending U.S. application Ser. No. 648,672, filed Jan. 13, 1976, now U.S. Pat. No. 4,016,578, by the present applicant for "Photographic Film Processing Apparatus." These raised areas tend to enhance the distribution in a manner that reduces the likelihood of voids at the trailing corners of the film unit.

These fluid distribution arrangements, however, have been found to be unsatisfactory for use with certain photoprocessing compositions which are more viscous than conventional compositions, particularly at low temperatures which increase the viscosity of the composition. One way to properly distribute the more viscous composition is to increase the degree of bending of the film unit after it leaves the processing rollers. In cameras such as those marketed by the Polaroid Corporation under the registered designation SX-70, there is a sufficiently long distance between the rollers and the exit slot to accommodate this increased bending without adversely affecting other operations of the camera. In other cameras with more severe space limitations, such as the camera marketed by the Polaroid Corporation under the registered trade designation Prontol, the necessary increase in bending can be achieved by a raised area or "bump" extending across the cam surface in a direction transverse to the direction of advance of the film units. When this modification in the cam surface is made, however, it has been found that the dark slide fails to eject from the camera with the desired degree of reliability and smoothness. This is because the dark slide is stiffer than the film units, and therefore requires an increased driving force to bend it toward the exit slot, but which can exceed the frictional engaging force between the processing rollers and the dark slide. As a result, the rollers tend to slip over the dark slide and it fails to eject. To correct this malfunction, it is necessary to open the camera and manually remove the dark slide. This is inconvenient, and is likely to expose one or more of the film units in the cassette.

It is therefore a principal object of this invention to provide a film unit deflection system for a self-developing camera and which produces a distribution of the process composition that covers the entire photosensitive area of the film unit, even at elevated viscosities associated with low temperatures, while at the same time not impeding the elimination of the dark slide from the camera.

Another object of the invention is to provide a deflection system which achieves the aforementioned advantages within a relatively short distance.

A further object of the invention is to provide a deflection system that is simple, has a relatively low cost of manufacture, and requires a minimum redesign of present camera structures.

SUMMARY OF THE INVENTION

A self-developing camera according to the invention utilizes a fixed, inclined can surface and a resilient member to deflect a self-processing film unit as it proceeds from a pair of processing rollers to an exit slot in the camera housing. The resilient member is located intermediate the cam surface and the exit slot and is oriented with a longitudinal axis aligned generally parallel to the exit slot and to the processing rollers. A portion of the resilient member is substantially fixed and another portion, adjacent a free edge, is positioned to engage the film unit as it leaves the cam surface. The member is sufficiently stiff that is engagement with the film unit develops a spring force that acts on the film unit to produce a local longitudinal bending. The bending is of sufficient magnitude to distribute a uniformly thick layer of a photoprocessing composition over the image-forming area of the film unit with no voids, even at the trailing corners.

The resilient member, however presents a sufficiently low resistance to the advance of a dark slide, which is generally stiffer than the film units, so that it advances to the exit slot without losing its driving frictional engagement with the rollers. The relatively low resistance of the resilient member to the advance of the dark slide is understood to result from at least two factors, the flexibility of the member and its placement forward of the rollers to produce deflection with a relatively large radius of curvature. Preferably the resilient member is formed from a thin strip of a plastic material and the portion of the strip adjacent the free edge is angled obliquely with respect to and in the direction of advance of the dark slide and film units to promote the passage of the dark slide and to reduce fatigue of the strip after repeated deflections.

These and other features and objects of the invention will be more fully understood from the following detailed description which should be read in light of the accompanying drawings.

BRIEF DESCRIPTION OF THE DRAWINGS

FIG. 1 is a view in vertical section of a self-developing camera incorporating a film unit deflection system constructed according to the invention;

FIG. 2 is a top plan view of a self-processing film unit shown in FIG. 1;

FIG. 3 is an enlarged fragmentary view of the film processing and deflection system shown in FIG. 1 with a film unit entering the nip between the processing rollers;

FIG. 4 is a view corresponding to FIG. 3 showing the film unit as it is deflected by the camming surface into engagement with the resilient member;

DETAILED DESCRIPTION OF THE ILLUSTRATIVE EMBODIMENT

Figure 5:
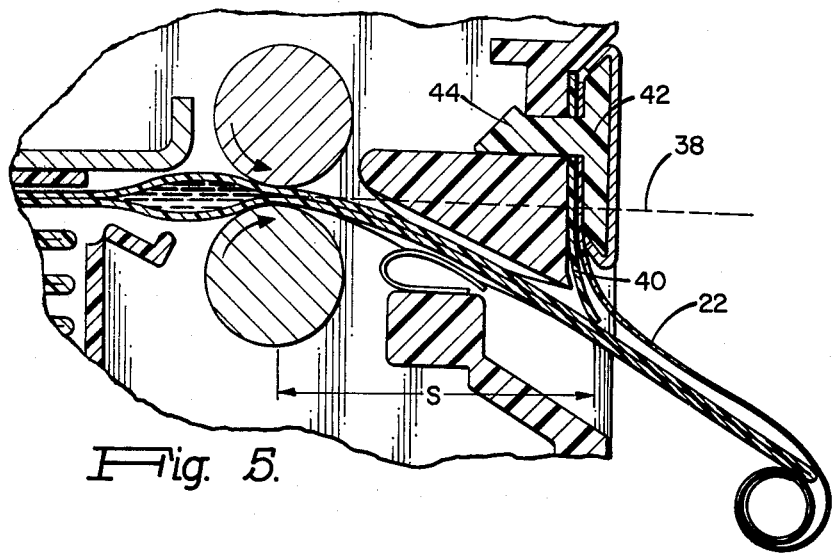
FIG. 5 is a view corresponding to FIGS. 3 and 4 showing the film unit fully deflected by the resilient member with the portions of the film unit exterior to the camera covered by a retractable and extensible light shield.

FIG. 1 shows a self-developing camera 10 of the type marketed by the Polaroid Corporation under the trade designation Pronto! and described in U.S. Pat. No. 3,967,304 and the commonly assigned, copending U.S. application Ser. No. 554,770, filed Mar. 3, 1975, now U.S. Pat. No. 3,987,589, by Donald H. Hendry, Andrew S. Ivester and Bruce K. Johnson for "Modular Photographic System" and with which the invention can be used. The camera has a relatively, thin rigid housing 12 that is light tight except at selected openings. The housing 12 supports various optical and mechanical elements such as an objective lens 14, a film container or cassette 16, a pair of processing rollers 18 and 20, at least one of which is driven, and a retractable and extensible light shield 22 of the type described in U.S. Pat. No. 3,940,774 to Ivester. The light shield 22 is shown in its retracted or coiled position within a film exit slot 24 formed in the lower front end of the housing 12. Light entering the camera 10 through the lens 14 is reflected by a mirror (not shown) through an exposure chamber 26 to expose a horizontally positioned film unit held in the cassette 16 at the camera image plane. For the purposes of this description the orientation of the cassette and the film units held in the cassette, as shown in FIGS. 1–5, will be assumed to be horizontal. Also, the right hand portions of the camera, as shown, will be described as the front or forward end.

Figure 8:
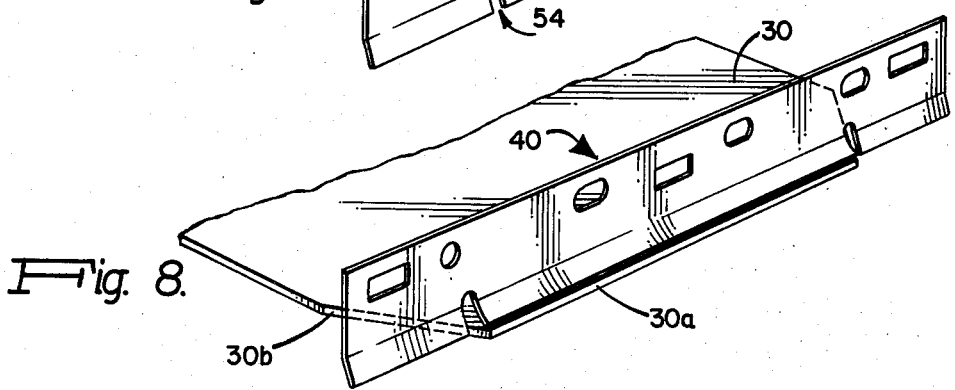
FIG. 8 is a view of the resilient member shown in FIG. 7 engaging the leading edge of a dark slide.

The cassette 16 holds a plurality of self-processable film units 28 in a stacked relation with their image-forming photosensitive surfaces facing upwardly toward the exposure chamber 26. The film units 28 are of the so-called integral negative-positive type and preferably of the type presently available for the camera marketed by the Polaroid Corporation under the registered designation SX-70. The cassette also includes a dark slide 30 (FIGS. 1 and 8) located at the top of the stack. The dark slide is essentially a generally rectangular sheet of a flexible, opaque material such as cardboard which is sufficiently large to completely block, and thereby optically shield, a generally square exposure opening (not shown) formed in the upper wall of the cassette 16. The dark slide typically is sufficiently stiff to protect the film unit from damage prior to insertion in the camera, and to serve as a mailer from the user as well as to carry instructional information. Due to these requirements, the typical dark slide is stiffer, i.e., more resistant to deflection, than a single film unit.

The dark slide, like the underlying film units, is removed by a pick mechanism that advances the foremost element in the cassette, whether the dark slide or a film unit, through an opening 16a (FIGS. 3–5) in the front end of the cassette to the nip of the processing rollers 18 and 20. As shown in FIGS. 1 and 3–5, the foremost element held in the cassette, and the nip of the processing rollers, are generally coplanar and define a substantially flat portion of a film processing path. Since the first element in the cassette is the most difficult to remove, the removal of the dark slide first, before the film units, has the advantage of reducing the likelihood of damage to one of the film units by frictional abrasion or by a malfunction of the pick mechanism. It should be noted that the stiffness of the dark slide resists an undesirable buckling of each slide during its removal.

With reference to FIGS. 1–3, each film unit 28 is a substantially flat, multi-layer laminate structure having a generally rectangular configuration. The lateral or border portions 28b, 28c, 28d and 28e of the film unit are opaque and surround a generally square or rectangular photosensitive image-forming area 28a. The flexible laminas of the film unit 28 are secured together at these marginal portions. A front marginal portion 28b of each film unit contains a rupturable pod or container 32 that holds a fluid photoprocessing composition. The photoprocessing composition is approximately a million times as viscous as water. Moreover, the viscosity of the composition increases at "low" temperatures. The lowest recommended operating temperature for one currently available film is typically 45° F.

With reference to FIGS. 3–8, a ramp member 34 secured to the housing 12 has an inclined surface 36 extending generally from the nip of the rollers 18 and 20 the camera exit slot 24. The upper or leading edge 36a of of the inclined cam surface 36 is positioned adjacent the nip of the processing rollers to intercept the film unit passing through the processing rollers. As the processing rollers rotate and drive the film unit forward, the cam surface 36 guides the film unit toward the exit slot 24 which is aligned generally parallel to the rollers 18 and 20 but displaced downwardly from the generally planar processing path portion defined by the foremost film unit or dark slide (coincident with the image plane) and the nip of the processing rollers. This plane is indicated in FIG. 5 by a construction line 38.

A pair of raised portions 36c of the cam surface are generally aligned with the side portions 28c and 28d of the film units passing over the surface 36. A pair of clips 39 bear on the raised portion 36c to hold the rear portions 28e of a fully processed film unit and thereby retain it in the exit slot for removal. The clips 39 and raised portions 36c also ensure that a following unit will not bypass the light shield by advancing under the retained film unit.

A resilient deflector strip 40 having a generally rectangular shape is secured adjacent the trailing edge 36b of the inclined cam surface. A relatively less flexible mounting bar 42 sandwiches a fixed portion 40a of the strip 40 that is adjacent a longitudinally extending edge 40b of the strip. Three backing pins 44 formed integrally with the mounting bar 42 each penetrate an opening 46 formed in the strip portion 40a and are secured in aligned openings in the ramp member 34 above the surface 36 to secure the strip 40 to the housing. The bar 42 also has locating pins (not shown) which mate with other openings 48 and 50 formed in the strip 40. The bar 42 is preferably formed from a molded thermosetting plastic of the type forming the housing 12 and is sufficiently resilient to allow the snap-fit engagement of the pins 44 in the housing-mounted member 34.

Adjacent the longitudinally extending free edge 40c of the deflector strip 40 is a portion 40d which is obliquely angled toward the exit slot 24 in the direction of advance of the film units 30 and the dark slide 28 along the film processing path. This angling facilitates the passage of the film and dark slide and reduces the tendency of the strip 40 to fatigue and therefore fail to return to the same initial position after it is deflected and released. The angled portion 40d is spaced forward of the inclined cam surface, as shown. The strip portion 40d in its normal relaxed position (FIG. 3) intercepts the film unit or dark slide as it proceeds from the surface 36 to the exit slot as shown in FIGS. 4–5. The film unit or dark slide, driven forward by the rollers 18 and 20, displaces the portion 40d to a deflected position (FIGS. 4 and 5). Because the strip 40 is inherently resilient, this displacement of the portion 40d develops a spring force which produces a local longitudinal bending in the film unit over the processing path portion which extends between the processing rollers and the exit slot. It should be noted, as shown in FIG. 5, that once the leading edge of the film unit has passed the free edge 40c of the resilient strip, the film unit is deflected sufficiently to lose contact with the camming surface 36 and is in sliding engagement with the edge 40c.

Figure 6:
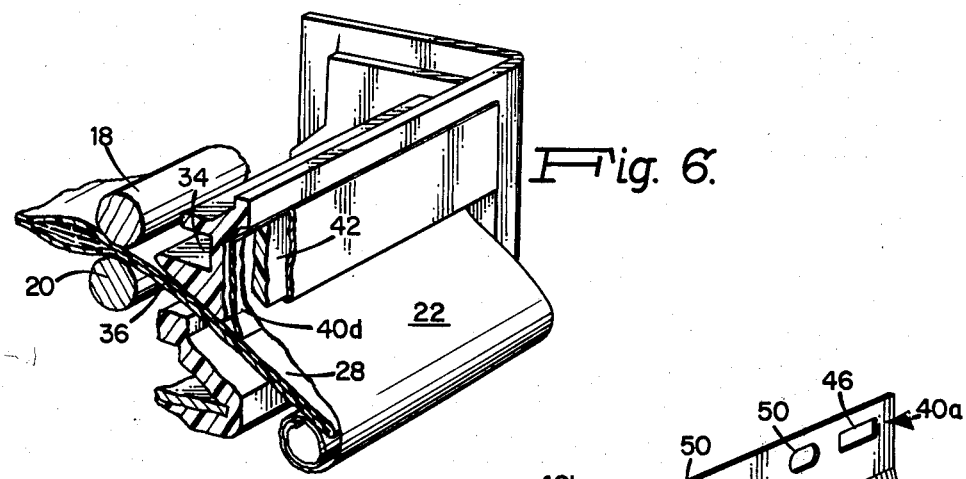
FIG. 6 is a perspective view with portions broken away corresponding to FIG. 5.
Figure 7:
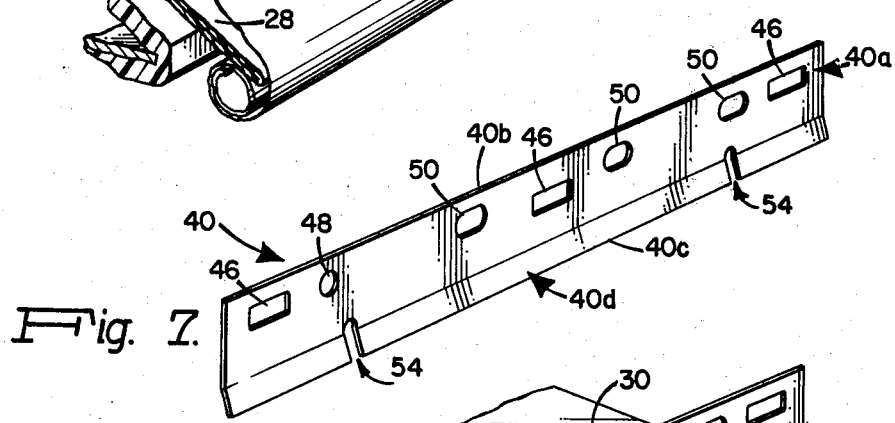
FIG. 7 is a perspective view of a resilient member according to the invention.

Preferably the light shield 22 is secured by clamping a mounting end between the plate 42 and the strip 40 so that in its retracted, coiled position the shield lies within the exit slot 24. As is best seen in FIGS. 5 and 6, as the film unit advances through the exit slot, it engages and extends the shield to prevent light from being piped longitudinally within the film unit. This light piping, if not controlled, will fog the "following" portions of the film unit which has not been fully processed. The shield is shorter than the film unit so that it disengages from it and recoils when the film unit is fully processed and held in the exit slot at its trailing edge 18d by the clips 39. It is important that the resilient strip 40, or any other structure of the camera, not restrict or impede the recoiling of the shield 22 to the position shown in FIGS. 1, 3 and 4.

In operation, an exposed film unit is directed along the planar portion of the film processing path defined by the film plane and the nip of the processing rollers. The film unit 32 enters the processing rollers as shown in FIG. 3. The rollers are driven by an electric motor and gear train (not shown) which propel the film through the nip and toward the exit slot 24. The pressure exerted by the processing rollers 18 and 20 ruptures the pod 32 causing the fluid photoprocessing composition to be spread over the image-forming photosensitive area of the film unit.

As the film unit emerges from the nip of the processing rollers, it engages the cam surface 36 formed on the ramp member 34 and then the resilient strip 40. The spreading of the photoprocessing composition continues in the portions of the film unit that have passed through the nip. The initial deflection of the film unit by the cam surface enhances this continued spreading. As the film unit leaves the surface 36 and comes under the control of the resilient strip 40, the local longitudinal bending introduced by the resilient strip is of a sufficient magnitude to distribute the composition in a layer of generally uniform thickness over all portions of the photosensitive area, even with compositions of increased viscosity and a low temperature near 45° F. In particular, a significant advantage of the present invention is that the resilient strip 40 introduces a larger deflection within the relatively short distance between the processing rollers and the exit slot as measured along the horizontal than conventional post roller-processing deflection systems employed in similar cameras presently on the market. Another significant advantage of the present invention is that it imposes this increased deflection by contact with the advancing film unit at a point spaced farther from the rollers than in conventional ramp type deflection systems utilizing raised portions or "bumps" to produce increased deflection. Because of this larger spacing, designated S in FIG. 5, the deflection system of the invention offers a sufficiently reduced resistance to the advance of the dark slide 28 through the deflected portion of the processing path so that the dark slide ejects reliably. that, is the blade-like strip 40 produces the deflection with a larger arc, or greater radius of curvature. More particularly, while the dark slide is relatively stiffer than the film units, and hence requires a greater propelling force to advance it along a curved path than a film unit, the required driving force varies roughly with the third power of the spacing between the rollers and the point of deflection.

Since the deflection point with this invention (the point of contact with the portion 40d of the deflector strip) is spaced approximately twice as far from the rollers as the "bump" used heretofore, the required driving force is reduced roughly by a factor of eight. This reduction greatly reduces the likelihood that the dark slide will fail to eject. Another advantage of the increased spacing is that the dimensional tolerances of the deflecting elements are less critical. For example, the magnitude of the deflection of the film unit is less sensitive to variations in the distance the strip 40 projects into the processing path than to variations in the height of a deflecting bump formed on the cam surface at a point closer to the rollers.

The advance of the dark slide is also facilitated by the flexibility of the strip 40. When the strip engages the relatively stiffer dark slide, the strip 40 itself deflects to a larger degree than when it engages a film unit. As a result, the dark slide is bent less than the film unit with a corresponding decrease in the resistance offered by the strip 40.

To further promote the advance of the dark slide past the deflector strip 40, the strip is provided with a pair of open slots 54 which extend from its free longitudinal edge 40c through the angled portion 40d toward the fixed edge 40b. These slots are positioned along the edge 40c so that they are in alignment with the ends of the leading edge 28a of the dark slide at its diagonally trimmed leading corners 28b. As a result, upon its initial engagement with the strip 40, the advance of the dark slide is resisted only by the spring force of a central portion of the deflector strip lying between the slots 54, rather than by that of the entire length of the strip, i.e., the central portion plus both side portions which the strips define. This reduced initial impeding force to the movement of the dark slide also decreases the likelihood that the processing rollers will lose their driving engagement with the dark slide, causing the dark slide to fail to eject from the camera.

By way of illustration but not of limitation, where the invention is used to deflect Polaroid SX-70 film units in a camera of the type marketed by the Polaroid Corporation under the trade designation Pronto!, which has a horizontal distance between the center line of the rollers and the forward edge of the exit slot measured along the horizontal of approximately ¾ inch (19.0 mm), the resilient strip 40 preferably is formed from a sheet of 10 mil thick polyester plastic material sold by the E. I. DuPont de Nemours & Company under the trade designation Mylar. This strip has a modulus of elasticity of approximately 200,000 psi, an overall length of approximately 3 and ⅜ inches, an overall width or height of approximately 0.465 inches, an angle of bend of the portion 40c with respect to the fixed portion 40a of approximately twenty degrees, and slots 54 extending from the edge 40c for a distance for approximately 5/16 inch.

There has been described a film unit deflection system for a self-developing camera which achieves a relatively high degree of local longitudinal bending within a relatively short distance while at the same time not impeding the passage of the stiffer dark slide to the extent that it fails to eject from the camera. The film deflection system is particularly useful in providing a complete and generally uniform distribution of fluid photoprocessing composition having an elevated viscosity as compared to standard compositions particularly at low operating temperatures. In addition, the film unit deflection system does not interfere with the re-entry of the retractable light shield into the exit slot of the camera, is reliable, has a relatively low cost of manufacture and can be used on self-developing cameras presently on the market with no modifications to these cameras other than simple installation of the strip to the existing structure.

While the resilient strip 40 can be formed from materials other than a plastic, such as thin sheets of stainless steel, it has been found that thin metal strips act like cutting blades and are more likely to injure the film units or the user of the camera. It will also be understood that the dimensions and configuration of the resilient strip can be modified depending on features such as the degree of bending necessary to properly distribute the fluid photoprocessing composition, the available spacing between the processing rollers and the exit slot, the structural characteristics of the film unit and dark slide, and the nature of the fluid processing composition. Also, the ramp member 34 can be formed with a bevel edge located adjacent to the strip 40 and designed to support and position the angled portion 40d of the strip. These and other modifications will become apparent to those skilled in the art from the foregoing detailed description and the accompanying drawings. Such modifications are intended to fall within the scope of the appended claims.

What is claimed as new and secured by Letters Patent is:

1. In a self-developing camera for use with a cassette holding a plurality of film units in stacked relation with the foremost film unit covered by a dark slide having a greater stiffness than said film units, said camera including means for advancing the dark slide and the film units one at a time from a first end of the cassette in a first direction, said dark slide having diagonally-trimmed leading corners at each side of a straight leading edge, and each film unit including a supply of photo-processing composition, means for controlling the distribution of said composition within each film unit over a photosensitive portion thereof, comprising in combination:
a housing proximate to said first end of said cassette and having a film exit slot;
a pair of pressure applying rollers mounted on said housing intermediate said cassette first end and said exit slot, said rollers forming a nip that is spaced from said exit slot in a direction transverse to the plane of said film when said film is advanced in said first direction and said rollers being adapted to advance said film units and said dark slide to said exit slot and to initiate and spread of said composition from said supply over said photosensitive portion;
fixed guide means extending between said rollers and said exit slot along the path of advance of a film unit and a dark slide;
a flexible deflection member located at the end of said fixed guide means adjacent said exit slot, said flexible deflection member being disposed to intercept said film units as they leave said fixed guide means and to introduce a local longitudinal bending in said film units during their advancement past said member;
said flexible deflection member being sufficiently stiff so that in said deflected position it defines a film processing path portion lying between said rollers and said exit slot such that said local longitudinal bending in said film unit distributes a uniformly thick layer of said composition over all of the photosensitive portions of said film unit while being sufficiently flexible to allow the advance of said dark slide along said processing path with less longitudinal bending than said film unit;

said flexible deflection member comprising a strip of a resilient plastic material having one of its longitudinally extending edges fixed to said housing and the other of its longitudinally extending edges free and disposed to engage said film units and said dark slide;

said strip having a pair of open slits formed therein and extending from said free edge toward said fixed edge, and said slits being located to coincide with the intersections of said trimmed corners with said leading edge to offer a reduced initial resistance to the advange of said dark slide past said resilient strip; and said spacing between said rollers and said flexible member being sufficiently large to present a relatively low resistance to the advance of said dark slide along said film processing path.

2. In a camera according to claim 1, wherein said flexible strip is formed from a thin sheet of plastic having a modulus of elasticity of approximately 200,000 psi.

3. In a self-developing camera for use with a cassette holding a plurality of relatively flexible photographic film units in stacked relation with the foremost film unit covered by a comparatively stiff dark slide and including a supply of photoprocessing composition, said camera having a housing, means for advancing the dark slide and the film units within said housing one at a time from said cassette and for controlling the distribution of the photoprocessing composition over an exposed area of the film unit, the improvement wherein said advancing and controlling means includes deflectable means for intercepting said dark slide and said film units during their advancement and for introducing a given longitudinal bend in said film unit during a major portion of its advancement and a relatively less longitudinal bend in said dark slide such that each film unit is directed along a sufficiently curved film processing path during its advancement to provide distribution of said composition over said exposed area while said relatively stiff dark slide is directed along a less curved path to thereby reduce resistance to the advance of said dark slide.

4. The improvement of claim 3 wherein said advancing and controlling means includes a pair of pressure applying members defining an elongated gap for guiding said dark slide and said film units along a given path and for initiating said distribution of said composition for each film unit, and said deflectable means comprises an elongated strip of resilient material having one of its longitudinal edges fixed to said housing and the other of its longitudinal edges free and disposed in said given path to engage said film units and said dark slide, said flexible member being sufficiently stiff to deflect said film units along said curved film processing path while being sufficiently flexible to allow advance of said dark slide with less longitudinal bending.

5. The improvement of claim 4 wherein said advancing and controlling means additionally includes fixed deflection means for engaging and bending said dark slide and said film units as they are advanced from said pressure applying members, said fixed deflecting means being mounted on said housing between said pressure applying members and said elongated strip, and said strip having its free edge spaced with respect to said fixed deflecting member so as to move at least said film unit away from engagement with said fixed deflecting means when said film units are in engagement with said resilient strip and said pressure applying members.

6. The improvement of claim 5 wherein said advancing and controlling means includes fixed deflecting means mounted on said housing in leading relation to said deflectable means so as to intercept said dark slide and said film units and to longitudinally bend at least said film units prior to engagement thereof with said deflectable means, and said deflectable means has sufficient stiffness so as to deflect said film units away from engagement with said fixed deflecting means.

7. The improvement of claim 6 wherein said deflectable means has sufficient flexibility relative to the stiffness of said dark slide to permit said dark slide to remain in engagement with said fixed deflection means during such advancement such that said film units follow a curved path determined by said deflectable means while said dark slide follows a less curved path determined primarily by said fixed deflecting means.

* * * * *